April 18, 1950     O. C. BRUCE     2,504,249

GAUGE FOR SETTING TOOLS FOR CUTTING SCREW THREADS

Filed Feb. 21, 1946

INVENTOR.
Omar C. Bruce
BY
Murray, Sackhoff & Paddack
ATT'YS

Patented Apr. 18, 1950

2,504,249

UNITED STATES PATENT OFFICE 2,504,249

GAUGE FOR SETTING TOOLS FOR CUTTING SCREW THREADS

Omar C. Bruce, Anderson Township, Hamilton County, Ohio

Application February 21, 1946, Serial No. 649,327

4 Claims. (Cl. 33—185)

The present invention relates to improvements in gauges for setting screw-cutting tools and is directed to a novel device particularly adapted for cooperation with certain parts of screw cutting, engine lathes for simplifying accurate tool adjustment preliminary to screw-cutting operations.

An object of the invention is to provide a gauge for setting tools for cutting screw-threads which is susceptible of accurate tool adjustments in that said gauge has support means for association with the tail stock of a screw-cutting engine lathe thereby permitting an operator free use of both hands in adjusting the cutting tool to the gauge setting.

Another object of the invention is to provide a gauge which will maintain a fixed position on an engine lathe so that a cutting tool may be referred to it for a series of identical and accurate tool setting operations.

A further object of the invention is to provide a compact and accurate device for attaining the foregoing objects and also other objects which will be apparent from the following specification and drawings and specifically pointed out in the claims.

In the drawings which illustrate the preferred embodiment of my invention:

Figure 1:
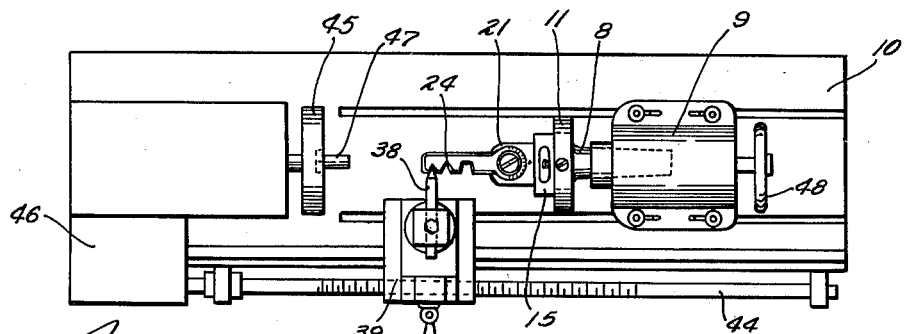
Fig. 1 is a plan view of an engine lathe, such as a lathe, arranged for cutting screw threads in a work piece, my gauge being illustrated in operative relationship with the lathe parts.

My gauge for setting tools for cutting screwthreads comprises a tapered shank 8 which is receivable in the tail stock 9 of an engine lathe 10. The outer flared end of the shank is developed into an integrally formed shoulder 11 which is disc shaped in transverse elevation and has its center coinciding with the axial center of the shank.

An annular recess 12 is formed coaxially in the outer face of the shoulder 11, said recess having a side wall 13 disposed parallel to the axial center of the shank and a bottom wall 14 positioned in a plane at right angles to said axial center of the shank. A holder 15 is mounted on the shank for rotational movement by means of a cylindrically formed inner portion 16 which is machined to snugly fit the sides 13 of the recess 12, said holder having a flat back wall which engages the back wall 14 of said recess. A V-shaped, peripheral groove 17 is formed around the cylindrical portion 16 intermediate its longitudinal extremities and is engageable by a tapered portion 18 of a set screw 19 passing through a threaded bore 20 formed in the shoulder 11. Upon loosening of the set screw 19, the holder 15 may be transversely inclined to any desired position relative to the shank 8 and upon tightening said set screw the holder may be fixed in the selected position on the shank.

Figure 2:
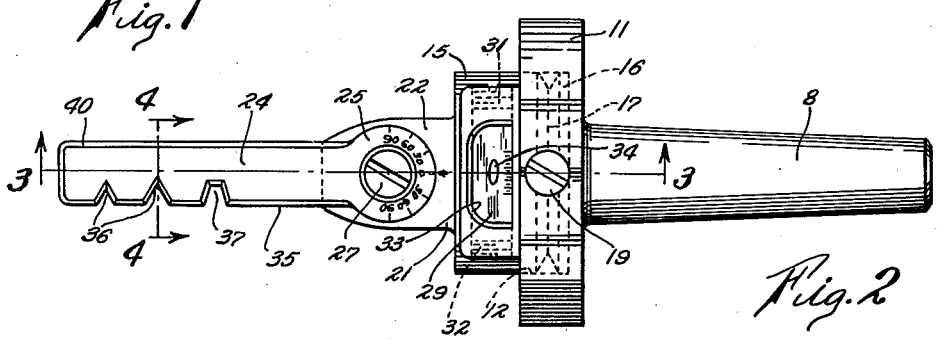
Fig. 2 is an enlarged, top plan view of my gauge for setting tools for cutting screw-threads.
Figure 6:
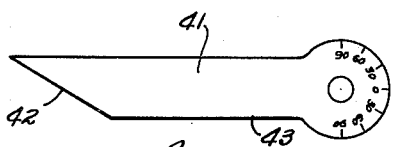
Fig. 6 is a modified form of blade for the gauge.
Figure 3:
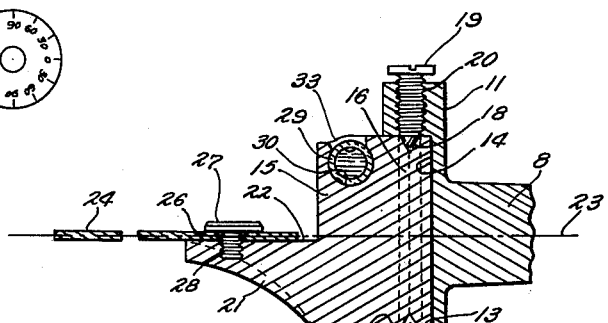
Fig. 3 is a fragmental, cross-sectional view taken on line 3—3 of Fig. 2.
Figure 5:
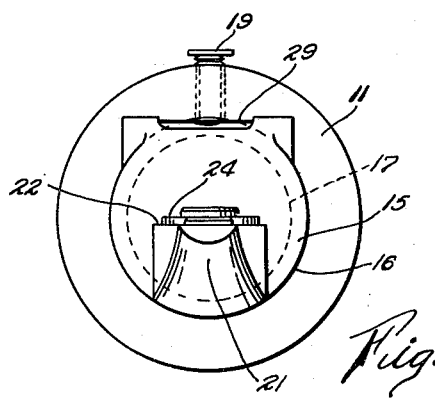
Fig. 5 is a front elevational view of my gauge, illustrated in Fig. 2.
Figure 4:
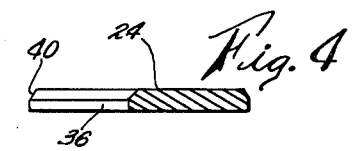
Fig. 4 is an enlarged cross-sectional view taken on line 4—4 of Fig. 2.

A platform 21 extends longitudinally from the front of the holder 15 and as indicated in Fig. 3, said platform may be formed integrally with the body portion of the holder. The platform is provided with a flat supporting face 22 which has a longitudinally extending center line therein disposed in parallel relationship with an extension of the axial center 23 of the shank 8. A flat blade 24 is pivotally mounted on the platform for movement in the plane of the face 22, said blade having a circular inner head portion 25 provided with a centrally disposed, annular opening 26. A set screw 27 is passed through the opening and receivable in an internally threaded bore 28 formed in the platform 21. As indicated in Fig. 2 the circular edge of the head portion 25 is calibrated in degrees, said calibrations being referable to a fixed line on the platform to indicate the angular disposition of the blade relative to the longitudinal center line of the gauge.

The means for indicating the transverse inclination of the blade 24 and also of the flat face of the platform 22 comprises a level or inclinometer bulb 29 positioned within an annular bore 30 formed transversely through the upper portion of the holder 15. The bulb is secured in the opening by oppositely disposed set screws 31 and 32 threaded in the ends of the bore. The holder has a sight opening 33 formed between its upper wall and the bore so that a bubble 34 in the tube may be referred to calibrations formed on the transparent wall of the bulb. The tube has its axial center disposed parallel to a transverse line lying in the plane of the face 22, and the bubble will assume a central position relative to the calibrations when said surface is in a horizontal plane.

A longitudinal edge 35 of the blade 24 has two V-shaped sight openings 36 and a square sight opening 37 formed therein and, as illustrated in Fig. 1, said sight openings are adapted to engage a screw-cutting tool 38 positioned on a slide rest 39 of the lathe. The top side of the opposed longitudinal edges and the transverse outer edge of the blade are beveled as at 40 so as to reduce the material of the blade especially within the sight openings so that when a tool is inserted within said openings in nonalignment therewith light may easily be distinguished between the tool edge and the edge of the openings.

It is contemplated that my gauge may be used for chamfering tool settings and to this end a special blade 41 may be substituted for the blade 24, said former blade being provided with an inclined outer edge 42 disposed at an angle of thirty (30) degrees with a longitudinal edge 43 of said blade.

A machine to which my gauge may be readily adapted is illustrated in Fig. 1 and comprises an engine lathe 10 having rotatably mounted thereon a leading screw 44 which controls the longitudinal feed of the slide rest 39. The drive for the leading screw is selectively coupled with the drive for a rotatable face plate 45 through change wheels enclosed in a casing indicated generally at 46. A piece of round stock 47 is fixed concentrically in the face plate and comprises the work in which the screw thread is to be cut by the tool 38. The shank 8 of my gauge is receivable in the tail stock 9 of the machine tool and may be fixed therein by tightening the hand wheel 48 therefor. After the shank has been fixed in the tail stock the holder may be rotated in a transverse plane perpendicular to the axial center line of the shank 23 until the inclinometer indicates that the face 22 of the platform 21 is in a horizontal position. The tool 38 may then be referred to the tool openings 36 or 37 in the blade 24 to determine its proper inclination for the screw cutting operation.

What is claimed is:

1. A gauge for setting tools for cutting screw-threads on an engine lathe consisting of a tapered shank adapted for insertion into a tail stock of said lathe, an integral shoulder formed on the flared end of the shank and having a cylindrical socket formed in its outer face, said socket having its circular wall disposed concentrically with the axis of the shank, a holder having a cylindrical cooperating end rotatably mounted in the socket, a flat platform extending from the holder in a direction opposed to the mounting portion, the face of said platform lying in a plane containing a line disposed parallel to the axis of the shank, a longitudinally elongate profile plate pivotally mounted at one end upon the platform for movement in the plane of the face, said plate normally having the projected axis of the shank as its center line and having a straight tool reference edge normally disposed parallel to the axis of the shank, and a sight opening formed in said tool reference edge.

2. A gauge for setting tools for cutting screw-threads on an engine lathe consisting of a mounting means adapted for insertion into a tail stock of said lathe, a holder journalled in the mounting means for coaxial rotatory movement therewith, a flat platform extending from the holder in a longitudinal direction opposed to the mounting means, the face of said platform lying in a plane containing a line disposed parallel to the axis of the mounting means, a longitudinally elongate profile plate pivotally mounted at one end upon the platform for movement in the plane of the face, said plate normally having the projected axis of the mounting means as its center line and having a straight tool reference edge normally disposed parallel to the axis of the said means, and a sight opening formed in said tool reference edge of the plate.

3. A gauge for setting thread chasing tools for lathes consisting of a tapered shank which is adapted for insertion into the tailstock of said lathe, an integral shoulder formed on the forward end of the shank and having a cylindrical socket formed in its outer face, said socket having a circular wall disposed concentrically with the axis of the shank, a holder having a cylindrical cooperating end rotatably mounted in the socket, a flat platform extending from the holder in a direction opposed to the mounting portion, the face of said platform lying in a plane parallel to the axis of the shank, a longitudinally elongated profile plate pivotally mounted at one of its ends in face-to-face relation on the platform, said plate having its center line lying in a plane that includes the projected axis of the shank and having a straight tool reference edge disposed parallel to its axis, and a sight opening formed in said tool reference edge.

4. A gauge for setting thread chasing tools for lathes consisting of a mounting means adapted for insertion into the tailstock of said lathe, a holder journalled in the mounting means for coaxial, rotatory movement therein, a flat platform extending from the holder and having a face lying in an offset plane parallel to the extension of the axis of the mounting means, a longitudinally elongated profile plate pivotally mounted at one end in face-to-face position upon the platform, said plate in its mounted position having its center line lying in a plane that includes the projected axis of the mounting means, and a straight tool reference edge for the plate disposed parallel to the center line of the plate.

OMAR C. BRUCE.

REFERENCES CITED

The following references are of record in the file of this patent:

UNITED STATES PATENTS

| Number | Name | Date |
|---|---|---|
| 284,702 | Wyke | Sept. 11, 1883 |
| 300,533 | Thompson | June 17, 1884 |
| 624,535 | Powel | May 9, 1899 |
| 689,825 | Miller | Dec. 24, 1901 |
| 804,067 | Stowe | Nov. 7, 1905 |
| 888,826 | Kooken | May 26, 1908 |
| 1,686,318 | Gallasch | Oct. 2, 1928 |

FOREIGN PATENTS

| Number | Country | Date |
|---|---|---|
| 35,523 | Austria | Dec. 10, 1908 |